No. 794,860. PATENTED JULY 18, 1905.
E. J. GOULD.
FLY SCARER ATTACHMENT FOR SCREEN DOORS.
APPLICATION FILED JAN. 30, 1905.

Witnesses
E. F. Stewart
C. H. Woodward

Edwin J. Gould,
Inventor
by C. A. Snow & Co.
Attorneys

No. 794,860. Patented July 18, 1905.

UNITED STATES PATENT OFFICE.

EDWIN J. GOULD, OF BOULDER, COLORADO, ASSIGNOR OF ONE-HALF TO LOUIS A. EWING, OF BOULDER, COLORADO.

FLY-SCARER ATTACHMENT FOR SCREEN-DOORS.

SPECIFICATION forming part of Letters Patent No. 794,860, dated July 18, 1905.

Application filed January 30, 1905. Serial No. 243,402.

*To all whom it may concern:*

Be it known that I, EDWIN J. GOULD, a citizen of the United States, residing at Boulder, in the county of Boulder and State of Colorado, have invented a new and useful Fly-Scarer Attachment to Screen-Doors, of which the following is a specification.

This invention relates to devices for attachment to screen-doors operative by the opening and closing of the same for scaring flies and other insects therefrom and preventing them from entering as the door is opened and closed.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

Figure 1:
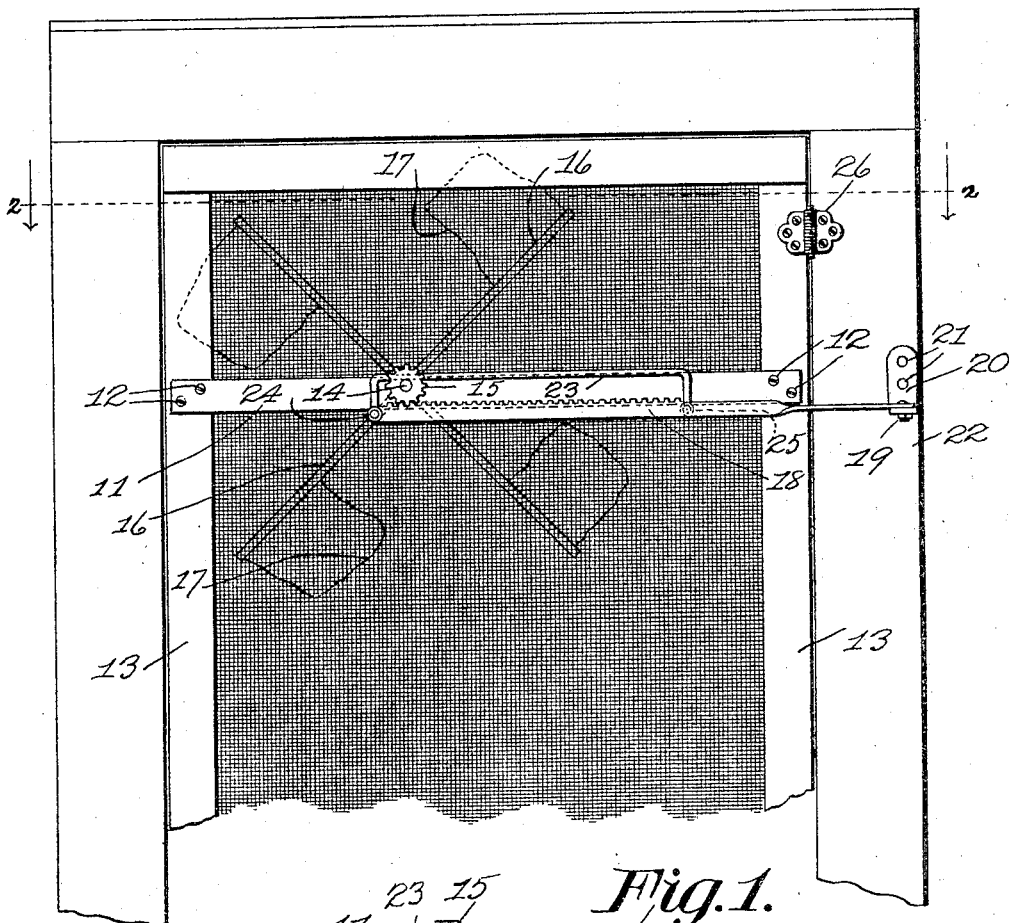
Figure 3:
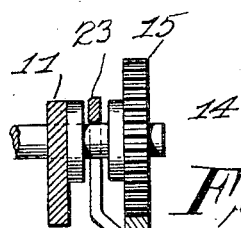
Figure 2:
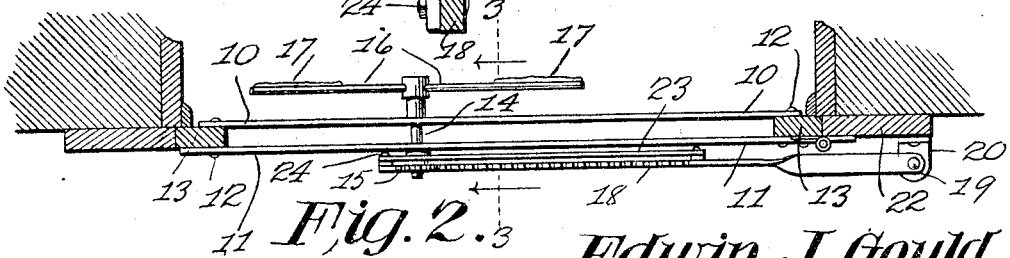

In the drawings, Figure 1 is a view of a portion of a door-casing and screen-frame with the improved device attached. Fig. 2 is a transverse section on the line 2 2 of Fig. 1. Fig. 3 is a transverse section, enlarged, on the line 3 3 of Fig. 2.

The improved device may be attached to any size or form of screen-door and comprises two supporting bars or plates 10 11 for securing, as by screws 12, to the screen-door frame 13 from opposite sides, the members 10 11 being thus spaced apart a distance equal to the thickness of the screen-door frame.

A shaft 14 is mounted for rotation through the bars 10 11 and with a gear-pinion 15 on one end and a plurality of radiating wings on the other end.

The "wings" may be of any desired size or form, but for the purpose of illustration are shown as formed of radial rods 16, having fabric flags or banners 17 at their terminals, which will fly about as the shaft is rapidly rotated and effectually scare flies and other insects from the neighborhood of the door, as hereinafter shown.

A rack-bar 18 is provided as a feature of the invention for operatively engaging the gear-pinion 15 from one side and pivoted by its free end at 19 to a bracket 20, the latter in turn secured, as by screws 21, to the face of door-casing 22 and spaced from the hinged edge of the screen-door.

A guide-rod 23 is connected by its ends, as at 24 25, to the rack-bar 18 and is offset toward the supporting member 11 and passes over the shaft 14 and rests thereon between the pinion 15 and the member 11. By this means the rack-bar is maintained in position in operative relation with the pinion on the shaft at all parts of the movements. By this arrangement it will be obvious that when the screen-door is opened the difference in location between the hinge 26 of the screen-door and the pivotal point 19 of the rack-bar will cause the rack-bar to actuate the pinion and rapidly rotate the wings 17 as the screen-door swings open and likewise rotate the wings in the reverse direction when the door is closed.

The supporting-bars 10 11 and shaft 14 will preferably be located near the upper outer corner of the swinging screen-frame, as illustrated, as the flies and other insects naturally gather more numerously near the upper portion of the screen, and as the screen is opened and closed the wings will be rapidly rotated and scare the flies away from the doorway-opening while unprotected by the screen-door.

The device is simple in construction, can be inexpensively manufactured, and applied very readily to any size or form of screen-door.

Having thus described the invention, what is claimed is—

1. A fly-scarer for screen-doors comprising spaced bars for attachment to the screen-door frame, a shaft mounted for rotation in said bars and having radiating wings at one end and a gear-pinion at the other end, a rack-bar engaging said pinion, and a bracket pivoted to the free end of said rack-bar and having means for attachment to the door-casing and spaced from the hinged edge of said screen-door.

2. A fly-scarer for screen-doors comprising spaced bars for attachment to the screen-door frame, a shaft mounted for rotation in said bars and having radiating wings at one end and a gear-pinion at the other end, a rack-bar engaging said pinion, at one side and carrying a guide-rod movably bearing upon said shaft between the pinion and adjacent supporting-bars, and a bracket pivoted to the free end of said rack-bar and having means for attachment to the door-casing and spaced from the hinged edge of said screen-door.

In testimony that I claim the foregoing as my own I have hereto affixed my signature in the presence of two witnesses.

EDWIN J. GOULD.

Witnesses:
PETER FRIEDMAN,
N. J. RICE.